March 4, 1958  D. W. R. WALKER  2,825,230
VIBRATORY MECHANISM
Filed Aug. 20, 1957  2 Sheets-Sheet 1
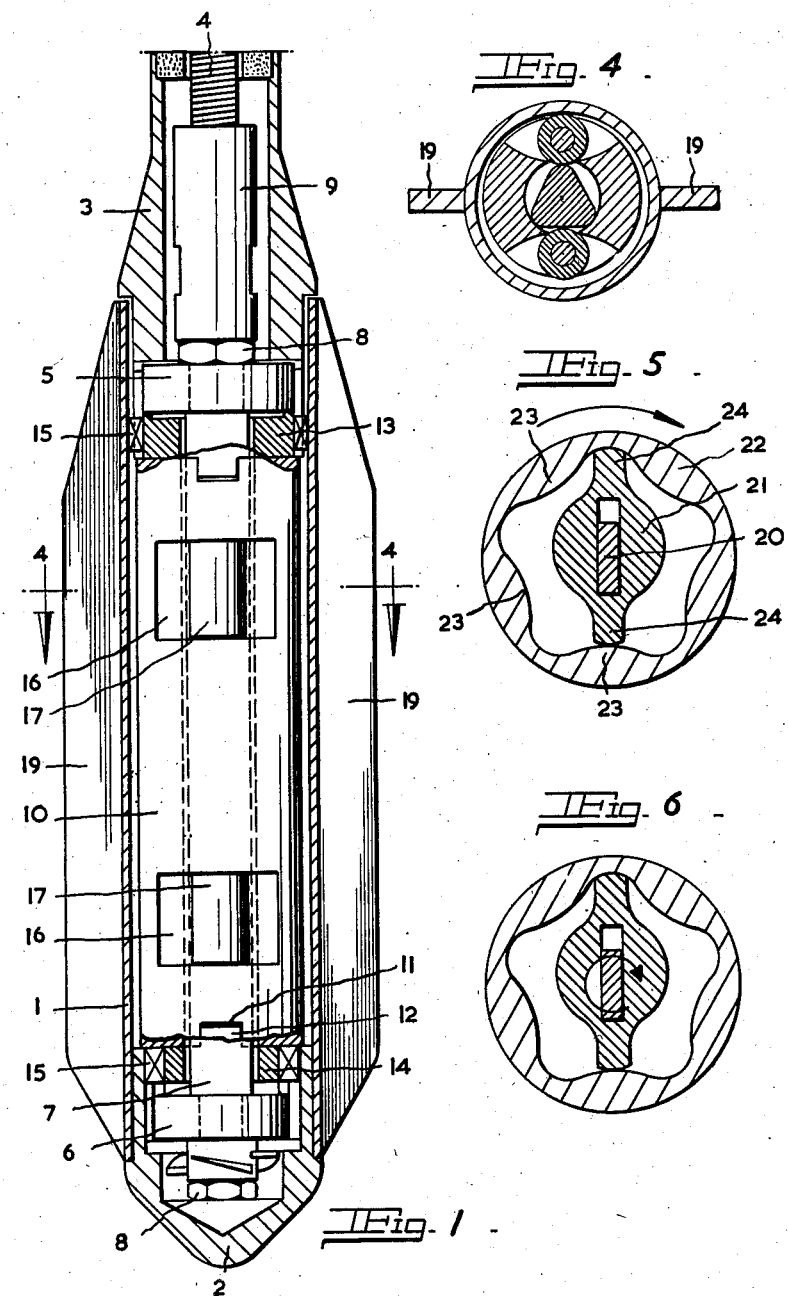

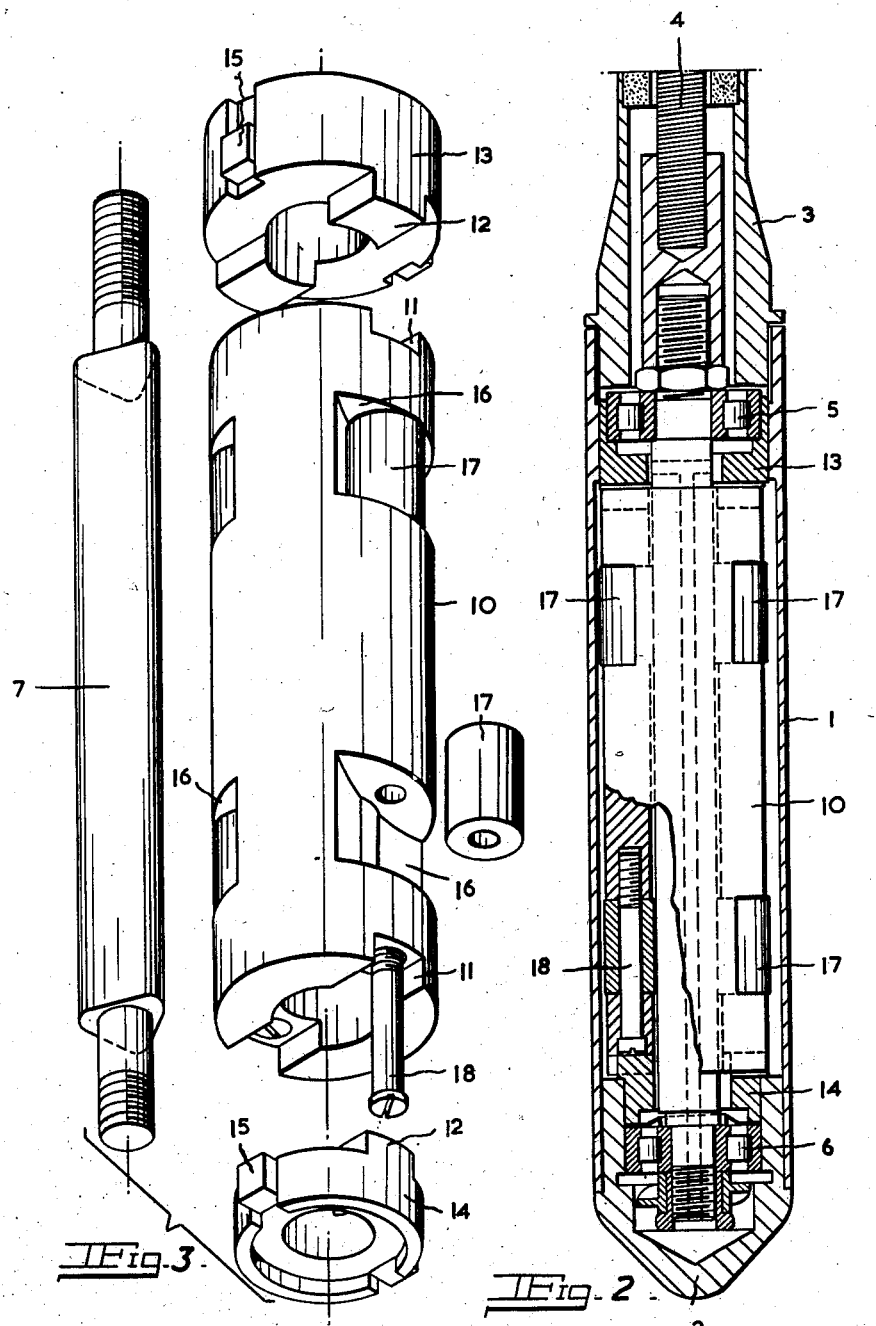

United States Patent Office 2,825,230
Patented Mar. 4, 1958

2,825,230

VIBRATORY MECHANISM

Derek William Ross Walker, Barnt Green, England, assignor of one-half to Flexible Drives (Gilmans) Limited, Staffordshire, England, a British company Application August 20, 1957, Serial No. 679,245

Claims priority, application Great Britain August 24, 1956

6 Claims. (Cl. 74—87)

This invention relates to vibrators designed for application to a plastic mass such as concrete, for the purpose of consolidating it.

The usual form of vibrator is in the form of a cylindrical or similarly shaped tube with a closed lower end and containing a rotating body, which may be driven through a flexible shaft from a fixed prime mover, or by an electric motor mounted within the vibrator. In the most frequently used forms this body is simply an eccentrically mounted mass carried in bearings in the tube, and rotating about the axis of the tube to impart vibrations to it. The frequency of the vibrations is equal to the rate of rotation of the body.

A frequency of 9,000 to 10,000 cycles per minute is desirable for the vibrations to be used in consolidating concrete, whereas a convenient speed of prime movers and electric motors is of the order of 3,000 R. P. M. To increase the speed of the drive by belting or gearing is both expensive and troublesome, as well as resulting in considerable added weight and bulk.

It has been proposed to increase the effective frequency of the vibrations in relation to the rotation of the body by making the body in the form of a conical pendulum carried by a universal joint at the upper end of the vibrator, and provided with a number of angularly spaced lobes or protuberances which strike inwardly directed protuberances carried on the inside of the tube. These repeated impacts between the unconstrained conical pendulum and the casing impart the necessary vibrations to the latter.

The aim of the present invention is to provide a vibrator in which the rotaing member is guided and is in contact with the members it acts on substantially the whole time, yet achieves a frequency of vibration higher than its speed of rotation.

According to the present invention a vibratory mechanism comprises an inner member mounted in bearings in an outer member for relative rotation about their common axis and between them a hollow inertia body surrounding the inner member guided for linear movement with respect to one of the said members in a direction perpendicular to the said axis, the engagement between the inertia body and the other member being such as to cause, on relative rotation of the inner and outer members, reciprocation of the inertia body in the said plane.

In the most convenient arrangement the inertia body is of substantially cylindrical shape and is guided at its top and bottom ends for sliding movement with respect to the outer member, which forms a shell-like casing, and the inner member is of uniform cam-shaped section having an odd number of lobes, for example three. Preferably the engagement between the cam and the inertia body is through the medium of rollers mounted in the inertia body.

An example of a vibratory mechanism according to the invention, together with two modifications, will now be described with reference to the accompanying drawings, in which:

Figure 1 is a sectional elevation of the vibrator, taken in an axial plane;

Figure 2 is a sectional elevation taken in an axial plane at right angles to that of Figure 1;

Figure 3 is an exploded view of the inner member and the inertia body, together with the mounting means for the latter;

Figure 4 is a section on the line 4—4 in Figure 1; and

Figures 5 and 6 are sections showing diagrammatically two modified forms of the apparatus.

The mechanism illustrated is in the form of a needle vibrator for insertion in the plastic mass to be consolidated. It comprises a shell-like casing 1 forming the outer member, closed at its lower end by a nose 2 and with its upper end screwed onto a sleeve 3 which forms an adaptor for connection to the outer cover of a flexible shaft 4 driven from, for example, a prime mover or an electric motor.

The outer member carries spaced roller bearings 5 and 6 near its upper and lower ends respectively, and in these is mounted the inner member, shown at 7, of which the greater part is of uniform section in the form of a three-lobed cam. The ends are cylindrical to fit the inner races of the bearings 5 and 6, and they are clamped to the races by nuts 8. The upper end of the member 7 is screwed into a sleeve 9 on the end of the flexible shaft 4. When the shaft 4 is driven, it will be seen that the inner member 7 rotates about its own axis, which remains coincident with the axis of the outer member, in contrast to the known needle-type concrete vibrators, in which the inner member rotates eccentrically with respect to the outer casing.

An inertia body, lying between the inner and outer members and enclosing the inner member, is formed by a hollow cylindrical sleeve 10. The upper and lower ends of the body 10 are provided with transverse diametrally extending slots 11 which have a sliding engagement with tongues 12 formed respectively on upper and lower mounting rings 13 and 14. These rings 13 and 14 are mounted rigidly in the outer member and are provided with integral keys 15 engaging keyways formed at the appropriate points in the casing 1 and the nose 2.

It will be appreciated that the mounting of the inertia body 10 in the outer member, whilst preventing its rotation in the outer member, allows it to slide in a diametral plane containing the axis of the assembly, in a direction perpendicular to the axis, this plane lying in the direction of the slots 11 and tongues 12.

At spaced points on opposite sides of the inertia body 10 there are recesses 16 in which rollers 17 are mounted for rotation on pins 18 about axes parallel to the axis of the assembly. The rollers 17 project slightly into the bore of the body 10 and, as will be seen from Figure 4, they are engaged by opposite sides of the inner member 7.

On rotation of the inner member by the shaft 4 the lobes of the cam will engage opposite rollers alternately and cause the inertia body 10 to oscillate back and forth in a diametral plane with respect to the casing 1. By virtue of its shape, the cam is always substantially in contact with both rollers and so there are no sudden and damaging impacts on reversal of the movement of the inertia member.

The mass of the inertia body is such that it tends to remain stationary itself, whilst the remainder of the assembly oscillates back and forth, imparting its vibrations to the mass in which it is immersed. Fins 19 are welded to the outside of the casing 1 to increase the area of contact with the mass and it will be seen that they lie in a plane at right angles to the plane of oscillation.

It will be seen that the body performs three complete oscillations for every revolution of the shaft 4, so that if the shaft is driven by a motor at, say, 3,000 R. P. M., the vibrations will be at a frequency of 9,000 cycles per minute. If five lobes had been used then the vibration frequency would have been five times the speed of rotation, but at the cost of a reduction in amplitude.

If a high frequency of vibration is not required, or if the shaft can be conveniently driven at a high enough speed, then the cam could be of single-lobed form, i. e. a simple eccentric, but the preferred forms have at least three lobes.

In the example described above, the inertia body is guided for linear movement with respect to the outer member and the inner member rotates within it. Figure 5 shows a modified arrangement in which the inner member, shown at 20, is flat and non-rotating, and the inertia body 21 is mounted for sliding movement on it. The outer member, shown at 22, is in the form of a hollow shell which has a rotational relationship with the inner member on bearings which may be the same as those of the earlier example, but in this case it is the outer member that rotates with respect to the inertia body and lobes 23 formed on its inner surface engage ribs 24 on opposite sides of the body 21 to cause the latter to reciprocate on the stationary inner member 20 at a frequency five times the rotational speed of the outer member 22.

Figure 6 shows an arrangement which is mechanically identical with that of Figure 5 but here the outer member is non-rotating and both the inner member and the inertia body rotate inside it, the inertia body at the same time oscillating in a plane which, though rotating in space, is fixed with respect to the inner member and is in fact the plane of the inner member.

Each of the examples described above has been of a needle-type vibrator for immersion in a plastic mass, but where the vibrator is to be applied to the outside of a container holding the mass to be vibrated, then the outer member need not be fluid tight and in fact could be of open form or apertured to allow a through draught of cooling air.

I claim:

1. A vibratory mechanism for application to plastic masses such as concrete comprising an inner member, an outer member, spaced bearings between said inner and outer members, said bearings guiding said members for relative rotation about an axis, spaced slides in said outer member, said slides having a general direction perpendicular to said axis of relative rotation, an inertia body, said body enclosing said inner member and being mounted for reciprocation in said slides, cam surfaces on said inner member, means on said inertia body engaged by said cam surfaces, and connecting means on said inner and outer members adapted for the connection of a drive from a power source, whereby on relative rotation of said inner and outer members said inertia body is caused to reciprocate in said slides.

2. A vibratory mechanism as set forth in claim 1, wherein said means engaging said cam surfaces comprise rollers mounted for rotation in said inertia body on opposite sides of said inner member.

3. A vibratory mechanism for application to plastic masses such as concrete comprising an inner member, an outer member, said outer member being mounted for rotation on said inner member about an axis and being hollow to define an inner surface, an inertia body having a sliding engagement with said inner member in a direction perpendicular to said axis, said inertia body being disposed within said outer member, and cam means on the inner surface of said outer body, said cam means engaging said inertia body whereby on relative rotation of said inner and outer members said inertia body is caused to reciprocate on said inner body in a direction perpendicular to said axis.

4. A vibratory mechanism for application to plastic masses such as concrete, comprising a hollow outer member, spaced upper and lower bearings in said outer member, an inner member mounted for rotation in said bearings about an axis, cam surfaces on said inner member, said surfaces having the form of a cam having an odd number of lobes, upper and lower slides in said outer member, an inertia body, said body enclosing said inner member and being mounted in said slides for reciprocation within said outer member in a direction perpendicular to said axis, and cam-engaging means on said body disposed on opposite sides of said cam surfaces in line with said direction of reciprocation, whereby on relative rotation of said inner and outer members said inertia body is caused to reciprocate in said slides.

5. A vibratory mechanism as set forth in claim 4, including fins on the outer surface of said outer member.

6. A vibratory mechanism as set forth in claim 5, wherein said fins lie in a plane perpendicular to the direction of reciprocation of said inertia body.

References Cited in the file of this patent

UNITED STATES PATENTS 2,490,122  Glegg _____ Dec. 6, 1949